(12) United States Patent
Francese et al.

(10) Patent No.: US 8,917,762 B2
(45) Date of Patent: Dec. 23, 2014

(54) RECEIVER WITH FOUR-SLICE DECISION FEEDBACK EQUALIZER

(75) Inventors: Pier A. Francese, Adliswil (CH); Christian I. Menolfi, Langnau am Albis (CH); Thomas H. Toifl, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 270 days.

(21) Appl. No.: 13/486,644

(22) Filed: Jun. 1, 2012

(65) Prior Publication Data

US 2013/0322512 A1 Dec. 5, 2013

(51) Int. Cl.
*H04L 27/06* (2006.01)
*H04L 25/03* (2006.01)

(52) U.S. Cl.
CPC .................................. *H04L 25/03146* (2013.01)
USPC ........................................................... 375/233

(58) Field of Classification Search
CPC ................ H04L 2025/03484; H04L 25/03146
USPC .................... 375/229, 230, 232, 233
See application file for complete search history.

(56) References Cited

U.S. PATENT DOCUMENTS

| 7,539,243 | B1 * | 5/2009 | Toifl et al. | 375/229 |
| 2008/0187036 | A1 * | 8/2008 | Park et al. | 375/233 |
| 2008/0198916 | A1 * | 8/2008 | Zeng et al. | 375/233 |
| 2013/0243070 | A1 * | 9/2013 | Ito et al. | 375/233 |

OTHER PUBLICATIONS

Toifl et al, "A 2.6 W/Gbps 12.5 Gbps RX with 8-tap Switched-Cap DFE in 32nm CMOS," 2011 Symposium on VLSI Circuits Digest of Technical Papers. 2011, pp. 210-211, 20-23.*
Hidaka et al., "A 4-Channel 10.3Gb/s Transceiver with Adaptive Phase Equalizer for 4-to-41dB Loss PCB Channel," IEEE 2011 International Solid-State Circuits Conference; Feb. 23, 2011, pp. 346-348, Session 20.1.
Menolfi et al., "A 28 Gb/s Source-Series Terminated TX in 32nm CMOS SOI," IEEE International Solid-State Circuits Conference Digest of Technical Papers; 2012, pp. 334-336, Session 19.6.
Park et al., "A 7Gb/s 9.3mW 2-Tap current-Integrating DFE Receiver," IEEE International Solid-State Circuits Conference Digest of Technical Papers; Feb. 2007, pp. 230-231, Session 12.5.
Toifl et al., "A 3.1mW/Gbps 30Gbps Quarter-Rate Triple-Speculation 15-tap SC-DFE RX Data Path in 32nm CMOS," 2012.
Toifl et al., "A 2.6 W/Gbps 12.5Gbps RX with 8-tap Switched-Cap DFE in 32nm CMOS," 2011 Symposium on VLSI Circuites Digest of Technical Papers; 2011, pp. 210-211, 20-23.

* cited by examiner

*Primary Examiner* — Kevin M Burd
(74) *Attorney, Agent, or Firm* — Cantor Colburn LLP; Daniel Morris

(57) ABSTRACT

A decision feedback equalizer (DFE) slice for a receiver includes a plurality of non-speculative DFE taps; and 3 speculative DFE taps, wherein the 3 speculative DFE taps comprise first and second multiplexer stages, each of the first and second multiplexer stages including 4 comparator latches, each of the 4 comparator latches having a programmable offset; and a multiplexer that receives 4 comparator latch outputs from the 4 comparator latches and outputs a multiplexer stage output, wherein the multiplexer is controlled by previous symbol decisions $d_{n-2}$ and $d_{n-3}$; and wherein the 3 speculative taps further comprise a 2:1 decision multiplexer stage that receives the multiplexer stage outputs of the first and second multiplexer stages and is controlled by a previous symbol decision $d_{n-1}$ to output a slice output signal $d_n$.

20 Claims, 10 Drawing Sheets

US 8,917,762 B2

RECEIVER WITH FOUR-SLICE DECISION FEEDBACK EQUALIZER

BACKGROUND

This disclosure relates generally to the field of computer hardware, and more particularly to a receiver for a computer with a four-slice decision feedback equalizer (DFE).

Data transmission over computer networks may rely on high-speed input-output (I/O) electrical data transmission channels linking a data transmitter to a data receiver. A transmitter and a receiver may be incorporated into any computer hardware or device that communicates data over a network. A channel may have a bandlimited frequency/phase response due to non-ideal conditions, which may distort or attenuate the transmitted data propagating through the channel. These non-ideal conditions within the channel may cause inter-symbol-interference (ISI), leading to timing uncertainties at the receiver and an increase in the bit error rate (BER) of the received data.

To compensate for the channel-induced ISI, various equalization techniques may be implemented in a receiver. These equalization techniques may include a combination of digital and/or analog filters. Among these various types of filters are finite impulse response (FIR) filters and infinite impulse response (IIR) filters. Nonlinear IIR filters, also referred to as decision feedback equalizers, or DFEs, may exhibit a relatively high equalization capability. A DFE is a nonlinear equalizer that uses previous receiver decisions to eliminate the ISI on pulses that are currently being demodulated. In other words, the distortion on a current pulse that was caused by previous pulses is subtracted from the current pulse.

BRIEF SUMMARY

In one aspect, a decision feedback equalizer (DFE) slice for a receiver includes a plurality of non-speculative DFE taps; and 3 speculative DFE taps, wherein the 3 speculative DFE taps comprise first and second multiplexer stages, each of the first and second multiplexer stages including 4 comparator latches, each of the 4 comparator latches having a programmable offset; and a multiplexer that receives 4 comparator latch outputs from the 4 comparator latches and outputs a multiplexer stage output, wherein the multiplexer is controlled by previous symbol decisions $d_{n-2}$ and $d_{n-3}$, wherein the previous symbol decisions $d_{n-2}$ and $d_{n-3}$ are received from two other respective DFE slices in the receiver; and wherein the 3 speculative taps further comprise a 2:1 decision multiplexer stage that receives the multiplexer stage outputs of the first and second multiplexer stages and is controlled by a previous symbol decision $d_{n-1}$ received from a third respective DFE slice in the receiver to output a slice output signal $d_n$.

In another aspect, a receiver with a four-slice decision feedback equalizer (DFE) includes a clock signal input configured to receive a clock signal; a clock signal divider configured to output four quarter rate clock signals based on the received clock signal; and four DFE slices, wherein each of the four DFE slices receives a respective quarter rate clock signal of the four quarter rate clock signals from the clock signal divider, wherein each of the four DFE slices comprises a respective DFE comprising 3 speculative taps and a plurality of non-speculative DFE taps, and wherein each of the four DFE slices outputs a respective symbol decision $d_n$, $d_{n-1}$, $d_{n-2}$, and $d_{n-3}$.

Additional features are realized through the techniques of the present exemplary embodiment. Other embodiments are described in detail herein and are considered a part of what is claimed. For a better understanding of the features of the exemplary embodiment, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Embodiments of a receiver with a four-slice DFE are provided, with exemplary embodiments being discussed below in detail. In order to remove or reduce distortion from a current pulse that is being demodulated in a DFE in a receiver, the results of multiple previous pulse decisions by the DFE may be analyzed and applied to the demodulation of the current pulse. However, use of multiple previous decisions requires multiple feedback paths, which may increase DFE power consumption, and also lead to timing difficulties in the DFE circuitry, especially at relatively high data rates. In order to reduce power consumption and relax timing requirements, a receiver with a four-slice DFE comprising a relatively low power, quarter-rate architecture may be implemented with a frontend including a continuous-time linear equalizer (CTLE) and a N-tap DFE. The N-tap DFE includes 3 speculative DFE taps that are implemented using comparator latches, plus N−3 non-speculative DFE taps which can be implemented using a switched-cap decision feedback equalizer (SC-DFE) approach. Each slice in the four-slice DFE may include two comparator latch/multiplexer stages, a 2:1 decision multiplexer that receives the outputs of the two comparator latch/multiplexer stages, and a spy path for comparator latch calibration. A DFE slice may further include redundant comparator latches that may be substituted for any other comparator latch to enable calibration of the receiver during run-time, and each comparator latch may have a configurable offset.

In order to implement a speculative DFE, the minimum number of required comparator latches is equal to $2^N$, where N is the number of previous decisions that are being used to make the current decision. Each comparator latch may have relatively high power consumption; therefore, the number of previous decisions that are used in a DFE may be limited.

However, non-speculative DFE taps may have relatively low power requirements. A N-tap DFE including eight comparator latches that make up a 3-tap speculative DFE in conjunction with the N−3 non-speculative DFE taps may therefore provide a reduced BER with relatively low overall power consumption. The receiver with a four-slice DFE may receive data at rates from 25 to 40 gigabits per second in some embodiments with relatively low power consumption and BER. The four-slice, quarter-rate architecture allows the timing in the DFE loop to be relaxed. Use of SC-DFE elements in the non-speculative DFE taps further relaxes the necessary timing. The quarter-rate architecture allows the integration time in the current-integrating DFE to be doubled, which allows a higher gain in the integrating amplifier. Further, clock speeds may be halved, and the duty cycle specifications may be relaxed. Electromigration concerns may also be reduced by reduction in the clock rate.

Figure 1:
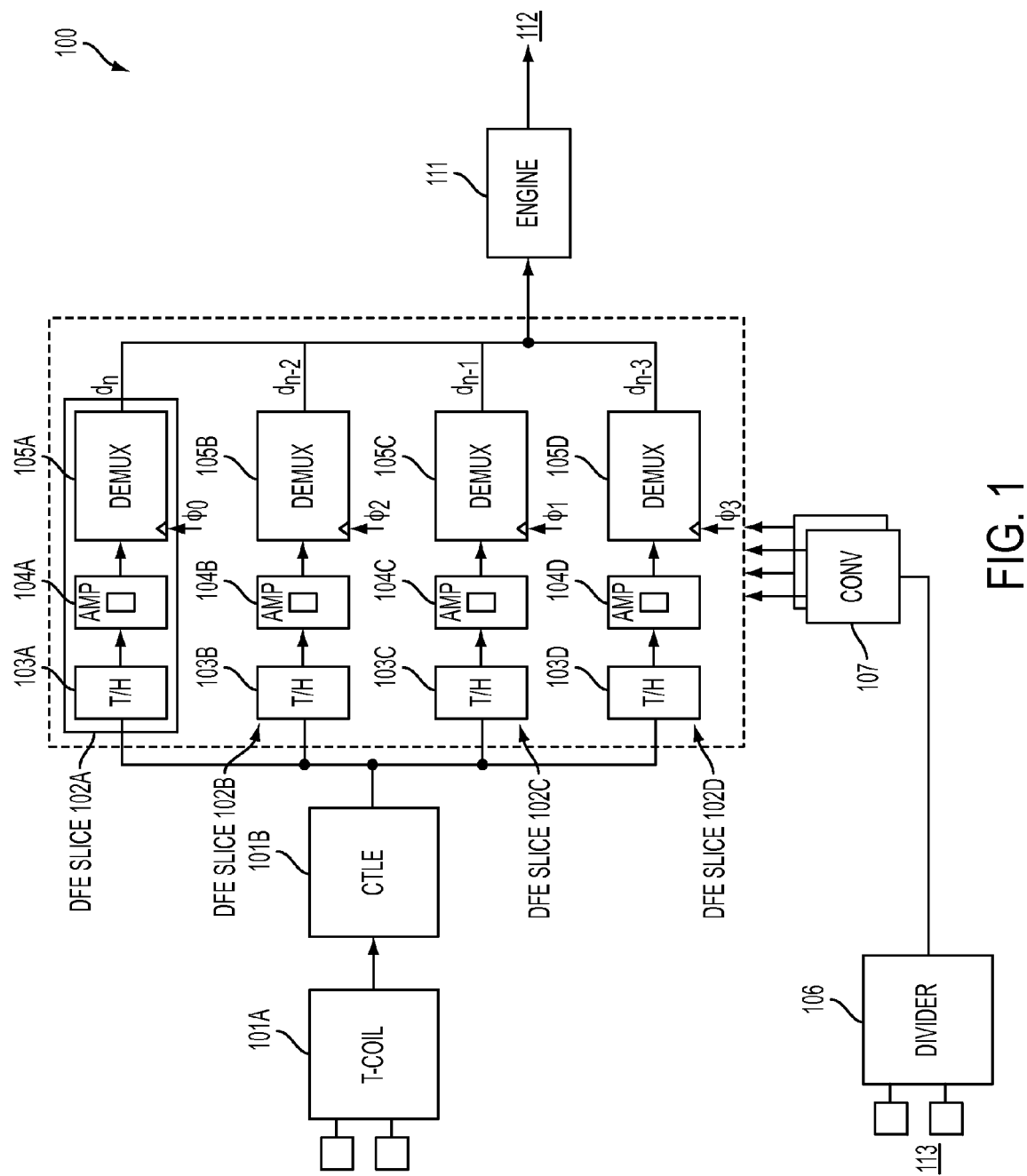
FIG. 1 is a circuit diagram illustrating an embodiment of a receiver with a four-slice DFE.

FIG. 1 shows an embodiment of a receiver 100 with a four-slice DFE. An input signal comprising received data is first received by a receiver input stage comprising a T-coil 101A and a CTLE 101B. The T-coil 101A may be used to optimize impedance matching in the receiver 100. The CTLE 101B may comprise a single-stage CTLE for bandwidth enhancement of the input signal. The CTLE 101B may include stacked peaking inductors to enhance the bandwidth of the input signal in some embodiments. The CTLE 101B then provides the bandwidth-enhanced input signal to four DFE slices 102A-D. Each DFE slice 102A-D runs at quarter clock rate, and comprises a respective track and hold (T/H) stage 103A-D, amplifier 104A-D, and demultiplexer stage 105A-D. The input signal is first sampled by track-and-hold (T/H) stages 103A-D in each the four slices. The amplifier 104A-D and demultiplexer stages 105A-D implement a 15-tap integrating DFE in each DFE slice 102A-D, with three speculative taps and 12 switched-cap taps. The four data outputs of the DFE slices 102A-D are synchronized to a single clock phase, and connected to pseudorandom bit sequence (PRBS) checker and correlation engine 111 for measuring and adjusting all receiver parameters (e.g., latch offsets, DFE coefficients, and/or CTLE gain and peaking). The PRBS checker and correlation engine 111 output a receiver output signal at receiver output 112. The timing in the receiver 100 is controlled by a half-rate input clock signal 113 that is provided to the receiver via a divider 106 and a current mode logic (CML) to complementary metal oxide semiconductor (CMOS) converter 107 that divide the clock signal down to a quarter rate. The CML to CMOS converter 107 provides individual quarter rate clock signals $\Phi_1$, $\Phi_2$, $\Phi_3$, and $\Phi_4$ to the DFE slices 102A-D, respectively. Symbol decisions $d_n$, $d_{n-1}$, $d_{n-2}$, and $d_{n-3}$ are issued sequentially by the DFE slices 102A-D. Symbol decision $d_n$ comprises a current decision from the currently active slice, $d_{n-1}$ comprises the symbol decision directly preceding $d_n$ from the previously active slice, $d_{n-2}$ comprises the symbol decision directly preceding $d_{n-1}$, and $d_{n-3}$ comprises the symbol decision directly preceding $d_{n-2}$. These previous symbol decisions are used to control the speculative DFE taps, as is discussed in further detail with respect to FIGS. 2-3.

Figure 2:
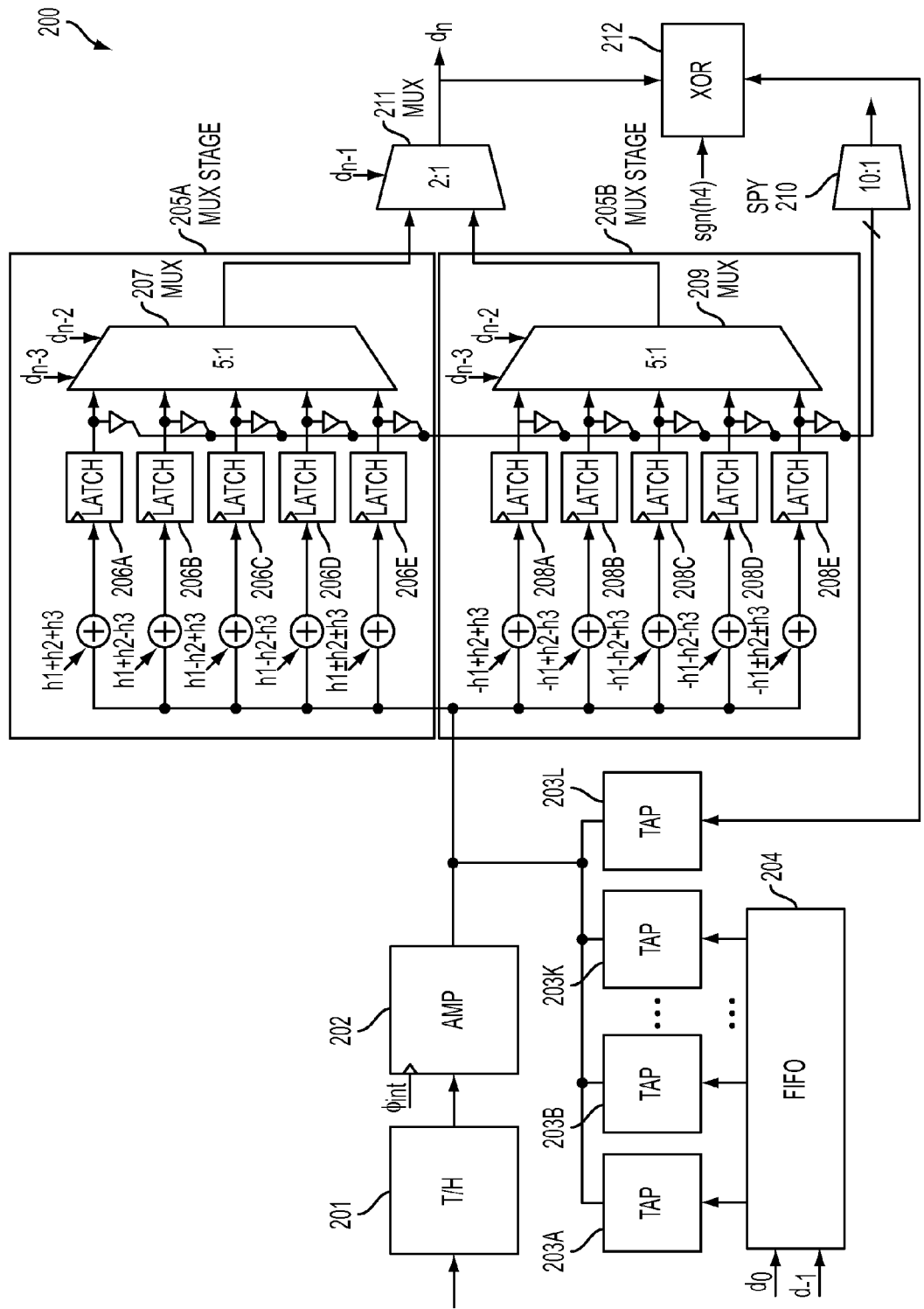
FIGS. 2-3 are circuit diagrams illustrating embodiments of a DFE slice for a receiver with a four-slice DFE.

FIG. 2 illustrates an embodiment of a DFE slice 200, which may comprise each of the four DFE slices 102A-D in a receiver 100 discussed above with respect to FIG. 1 in some embodiments. The input signal to DFE slice 200 is first sampled in T/H stage 201 before being amplified by a differential amplifier 202. Differential amplifier 202 is controlled by clock signal $\Phi_{int}$. The output of differential amplifier 202 is output to the FIFO 204 and the multiplexer stages 205A and 205B. The FIFO 204 acts as a feedback loop for the DFE slice 200, receiving and storing previous decisions $d_0$ and $d_{-1}$ from other DFE slices in the receiver and inputting these decisions to non-speculative DFE taps 203A-K. Feedback non-speculative DFE tap 203L directly receives the output signal of the DFE slice 200 via a feedback path. The non-speculative DFE taps 203A-L generate an input signal comprising various combinations of previous decisions of the DFE slice 200 for comparator latches 206A-E and 208A-E in the multiplexer stages 205A-D. Each of the comparator latches 206A-E and 208A-E has a respective offset, comprising various combinations of DFE coefficients h1, h2, and h3, that is added to the input signal. These DFE coefficients h1, h2, and h3 may be stored in a memory, and may be configured during operation of the DFE slice 200.

In multiplexer stage 205A, the outputs of comparator latches 206A-E are provided to 5:1 multiplexer 207, and in multiplexer stage 205B, the outputs of comparators 208A-E are provided to 5:1 multiplexer 209. Multiplexers 207 and 209 are controlled based on previous decision signals $d_{n-2}$ and $d_{n-3}$. The outputs of multiplexer stages 205A-B are provided to a 2:1 decision multiplexer 211. Decision multiplexer 211 is controlled by previous decision signal and selects one of the outputs of multiplexers 207 and 209 as slice output signal $d_n$. Slice output signal $d_n$ is also fed back via passgate/XOR logic 212 to feedback non-speculative DFE tap 203L. Passgate/XOR logic 212 may change the sign of $d_n$ based on the sign of DFE coefficient h4.

Eight of the comparator latches 206A-D and 208A-D form the 3 speculative taps, which, with the 12 non-speculative DFE taps 203 A-L, comprises a total of 15 taps in the DFE slice 200. Comparator latches 206E and 208E comprise spare comparator latches that may be swapped in for any of the other comparator latches 206A-D and 208A-D, respectively, for calibration of the DFE slice 200. This enables offset calibration of individual comparator latches during operation of the DFE slice 200. As shown in FIG. 2, the comparator latches 206A-D and 208A-D have offsets that are hardwired combinations of h1, h2, and h3, whereas the offsets of spare comparator latches 206E and 208E may be changed as needed for calibration of DFE slice 200. 10:1 spy multiplexer 210 may be used to directly monitor the output of any of comparator latches 206A-E and 208A-E during calibration. The non-speculative DFE taps 201A-L may comprise SC-DFE elements in some embodiments. While 12 non-speculative DFE taps 203A-L are shown in FIG. 2, this is for illustrative purposes only; a DFE slice such as DFE slice 200 may include any appropriate number of non-speculative DFE taps in conjunction with 3 speculative taps.

Figure 3:
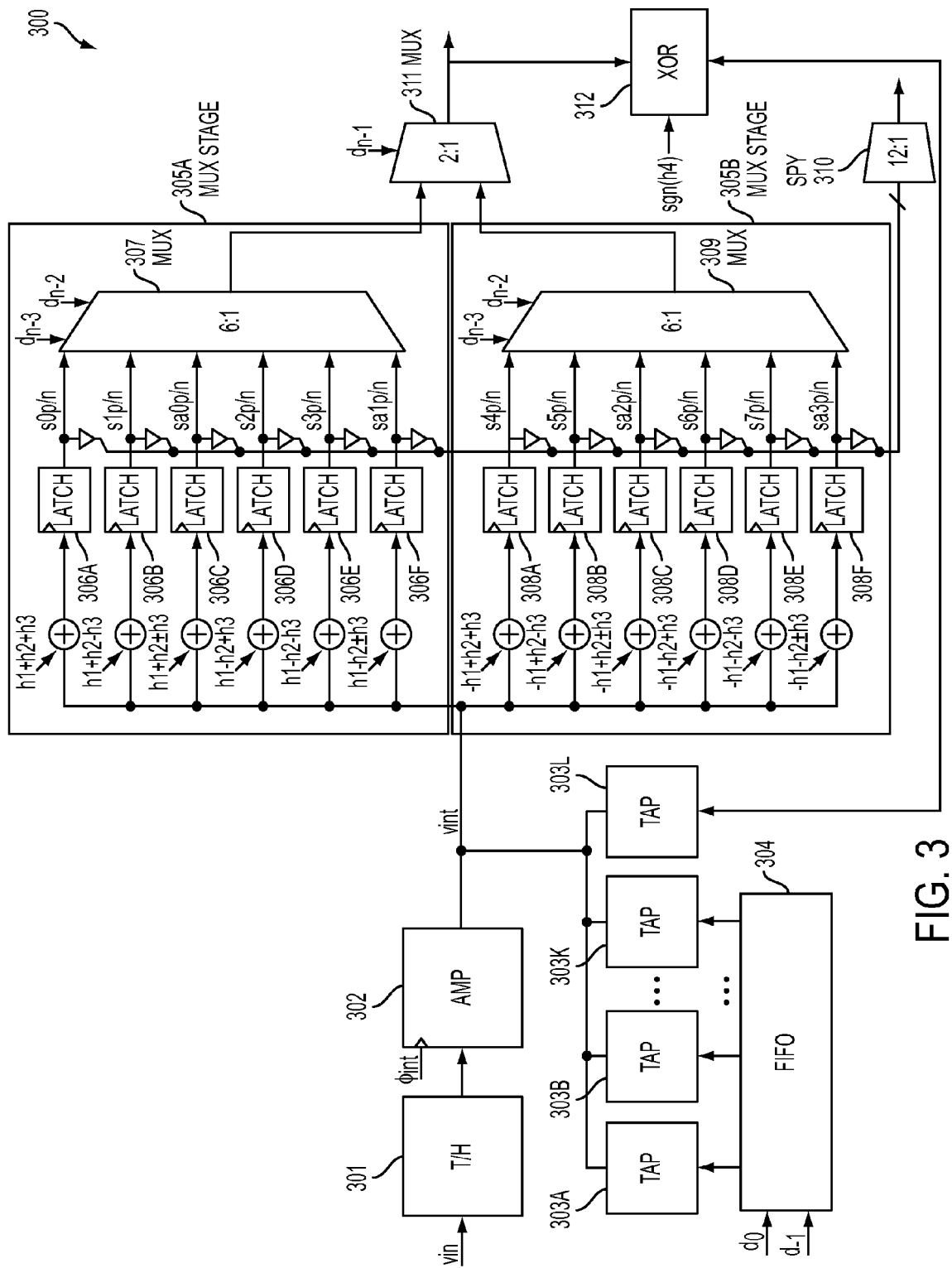

FIG. 3 illustrates another embodiment of a DFE slice 300, which may comprise each of the four DFE slices 102A-D in a receiver 100 discussed above with respect to FIG. 1 in some embodiments. DFE slice 300 includes a T/H stage 301, differential amplifier 302, FIFO 304, 12 non-speculative DFE taps 303A-L, multiplexer stages 305A and 305B, decision multiplexer 311, passgate/XOR logic 312, and a 12:1 spy multiplexer 310, which each function similarly to the various elements discussed above with respect to FIG. 2. However, instead of the 5 comparator latches 206A-E and 208A-E per multiplexer stage as was shown in FIG. 2, the multiplexer stages 305A-B of FIG. 3 includes 6 comparators latches 306A-F and 308A-F, and each of multiplexers 307 and 309 comprise 6:1 multiplexers. DFE slice 300 comprises 3 speculative taps, and therefore includes two spare comparator latches 306E-F and 308E-F per multiplexer stage 305A-B that may be swapped in for any of comparator latches 306A-D and 308A-D, respectively. Inclusion of two spare comparator latches 306E-F and 308E-F as is shown in DFE slice 300 of FIG. 3 may allow more precise calibration of the DFE slice 300 in some embodiments. The non-speculative DFE taps 201A-L may comprise SC-DFE elements in some embodiments. While 12 non-speculative DFE taps 303A-L are shown in FIG. 3, this is for illustrative purposes only; a DFE slice such as DFE slice 300 may include any appropriate number of DFE taps in conjunction with 3 speculative taps.

Figure 4:
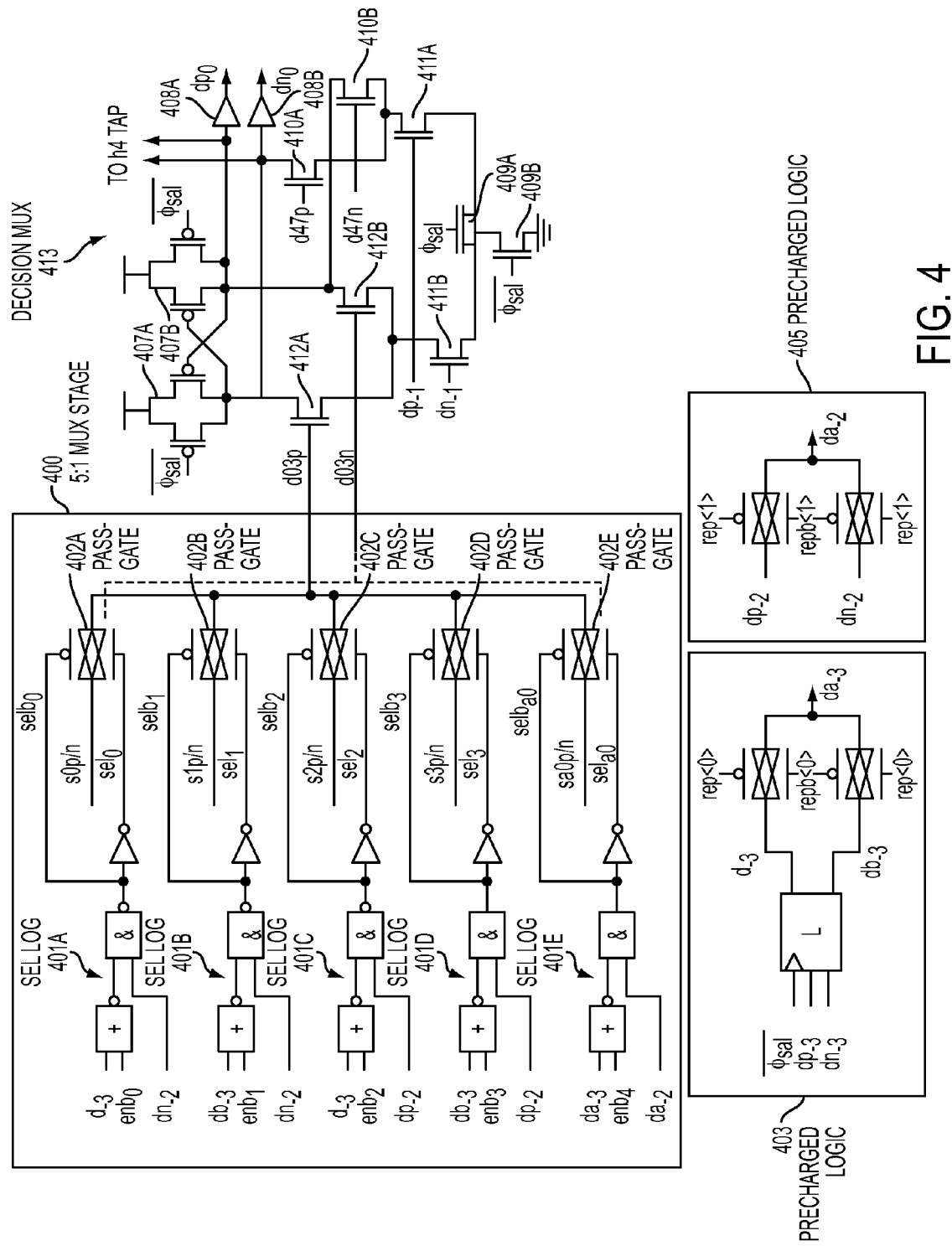
FIGS. 4-5 are circuit diagrams illustrating embodiments a DFE slice including swapping circuitry for a spare comparator latch for a receiver with a four-slice DFE.

FIG. 4 illustrates an embodiment of circuitry for a 5:1 multiplexer stage and a 2:1 decision multiplexer stage. The circuitry shown in FIG. 4 includes circuitry that is used to swap a spare comparator latch for one of the other comparator latches. The circuitry shown in FIG. 4 may be included in DFE slice 200 of FIG. 2 or DFE slice 300 of FIG. 3 in various embodiments, and is discussed with respect to FIG. 2. While a single 5:1 multiplexer stage 400 is shown in FIG. 4, a second multiplexer stage 400 is also included to implement a DFE slice. The 5:1 multiplexer stage 400 includes selection logic stages 401A-E and passgates 402A-E. Each of selection logic stages 401A-E receives a respective enable signal $enb_0$ to $enb_4$. During normal operation, enable signals $enb_0$ to $enb_3$ enable selection logic stages 401A-D, and enable signal $enb_4$ disables spare comparator latch 401E. During calibration, enable signal $enb_4$ enables the selection logic 401E for receiving its inputs $sa0p/n$ from spare comparator latch 206E, and one of enable signals $enb_0$ to $enb_3$ disables one of selection logic stages 401A-D receiving its inputs $s0p/n$, $s1p/n$, $s2p/n$, $s3p/n$ from comparator latches 206A-D, thereby substituting the spare comparator latch 206E for one of the comparator latches 206A-D, allowing calibration of the DFE slice. Various input signals to the passgates 402A-D, including signals $d_{-3}$, $d_{n-3}$, $d_{b-3}$, $d_{n-2}$, $d_{p-2}$, $d_{b-3}$, $d_{p-2}$, are based on inputs from the non-speculative DFE taps (for example, non-speculative DFE taps 203A-L of FIG. 2 or 303A-L of FIG. 3). Passgates 402A-E receive the respective outputs of comparator latches 206A-E, and implement a 5:1 multiplexer by selecting one output from the comparator latches 206A-E. The passgates 402A-E provide relatively fast signal transmission of the outputs $s0p/n$ to $s3p/n$ and $sa0p/n$ of comparator latches 206A-E to the 2:1 decision multiplexer stage 413. The passgate select signals received by passgates 402A-D (i.e., $sel_0$ to $sel_3$ and $sel_0$ to $selb_3$ and $sel_{a0}$) are generated by the selection logic stages 401A-D from previous decisions $dp/n_{-2}$ and $dp/n_{-3}$. The passgate select signals received by passgates 402E (i.e., $sel_{a0}$ and $selb_{a0}$) are generated by the selection logic stage 401E from signals $da_{-2}$ and $da_{-3}$, which are derived from previous decisions $dp/n_{-2}$ and $dp/n_{-3}$, respectively, and the signs of $da_{-2}$ and $da_{-3}$ may be controlled by signals rep<1> and rep<0>, respectively.

Signals $dp_{-k}$ and $dn_{-k}$ (where k=1, 2, 3) as shown in FIG. 4 (and also shown in FIGS. 5-6, which are discussed below) are the signals corresponding to the previous bit decisions $d_{-k}$ in pre-charged logic representation. Both signals $dp_{-k}$ and $dn_{-k}$ are pre-charged to either a zero or a one logic level, depending on the implementation, when $\Phi_{sal}$ is high, and therefore represent $d_{-k}$ (k=1, 2, 3) and the logical inverse of $d_{-k}$ when $\Phi_{sal}$ is low. The previous decision dp-3/n-3 is latched in stage 413 with clock signal $\Phi_{sal}$, resulting in the latched signal $d_{-3}$ and $db_{-3}$ Signal $d_{-3}$ is the signal corresponding to the previous bit decision $d_{n-3}$ in CMOS level logic, and $d_{b-3}$ is the logical inverse of $d_{-3}$.

The previous decision dp-3/n-3 is latched in stage 413 with clock signal $\Phi_{sal}$, resulting in the latched signal $d_{-3}$ and $db_{-3}$ Signals $dp_{-3}$, $dn_{-2}$, $dp_{-2}$, and $dn_{-2}$ are input to circuits 403 and 405 to generate the input signals $da_{-3}$, and $da_{-2}$ for selection logic stage 402E. Signals $dp_{-k}$ and $dn_{-k}$ (where k=1, 2, 3) as shown in FIG. 4 (and are also shown in FIGS. 5-6, which are discussed below) are the signals corresponding to the previous bit decisions $d_{n-k}$ in pre-charged logic representation.

Both signals $dp_{-k}$ and $dn_{-k}$ are pre-charged to either a zero or a one logic level, depending on the implementation, when $\Phi_{sal}$ is high, and therefore represent $d_{-k}$ and the logical inverse of $d_{-k}$ (k=1, 2, 3) when $\Phi_{sal}$ is low. Signal $d_{-3}$ is the signal corresponding to the previous bit decision $d_{n-3}$ in CMOS level logic, and $d_{b-3}$ is the logical inverse of $d_{-3}$.

The outputs d03p/n of the 5:1 multiplexer stage 400 is provided to the 2:1 decision multiplexer stage 413 via input switches 412A-B. The output d47p/n of the second 5:1 multiplexer stage (not shown) are input to the 2:1 decision multiplexer stage 413 via input switches 410A-B. Previous decision signal input switches 411A-B receive previous decision signals $dp_{-1}$ and $dn_{-1}$, which control which of the two inputs from the two 5:1 multiplexers is selected. Cross-coupled switches 407A-B are controlled by clock signal $\Phi_{sal}$ and determine timing in the 2:1 decision multiplexer stage 413. Output buffers 408A-B output slice output signals $dp_0$ and $dn_0$. Pulldown device 409A acts to increase the speed of the 2:1 decision multiplexer stage 413 by pulling down the load in the 2:1 decision multiplexer stage 413, and is also controlled by clock signal $\Phi_{sal}$. The 2:1 decision multiplexer stage 413 is precharged to VDD when $\Phi_{sal}$ is low, and when $\Phi_{sal}$ goes high, one of the two 5:1 multiplexer outputs d03p/n d47p/n is selected depending on the previous decision input $dp/n_{-1}$. Output stages 408A-B output slice output signals $dp_0$ and $dn_0$. The output signals $dp_0$ and $dn_0$ are a output to the passgate/XOR logic 212/312 as was shown in FIG. 2/3 as signal h4 to control DFE tap 4.

Figure 5:
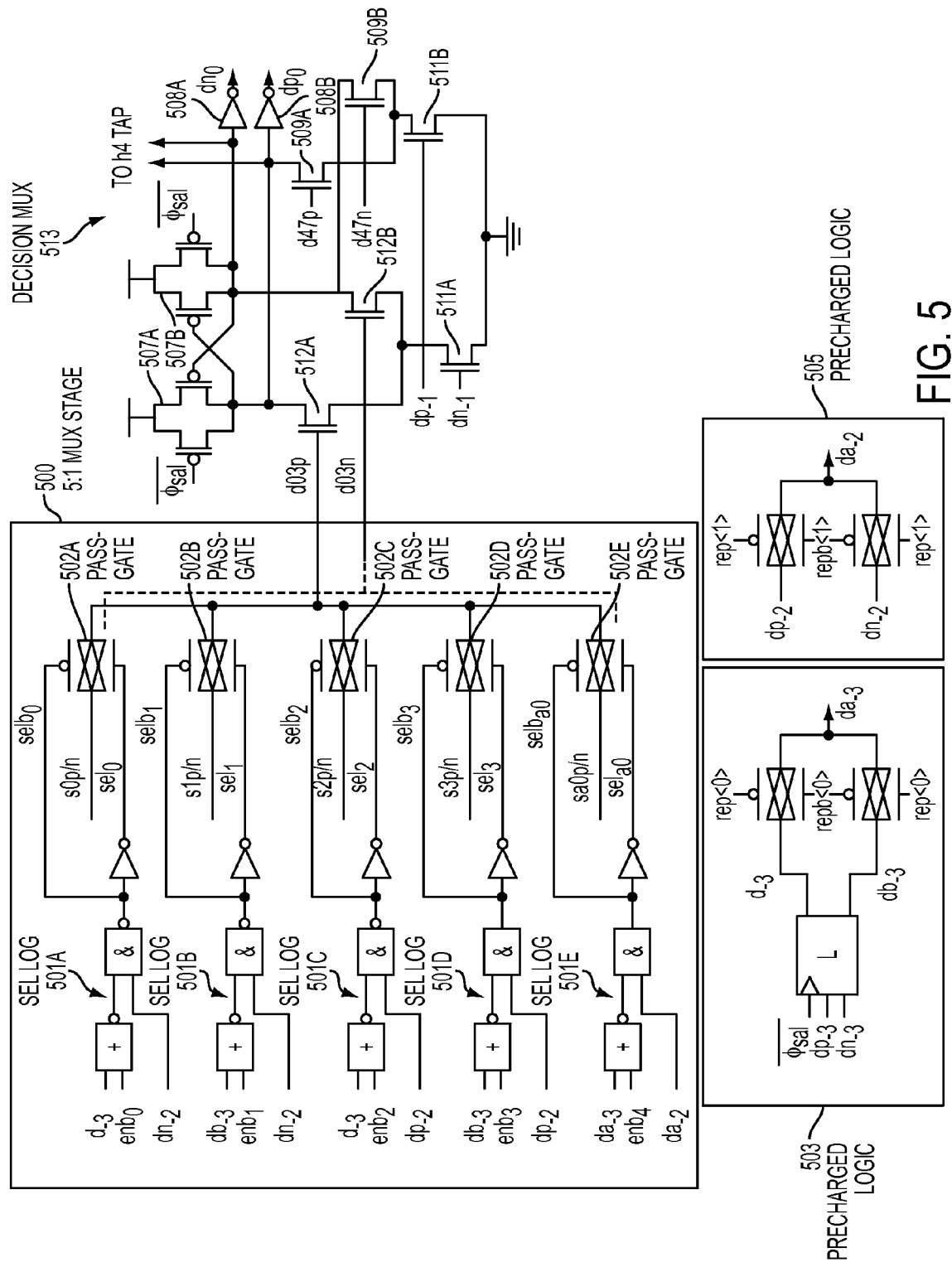
Figure 6:
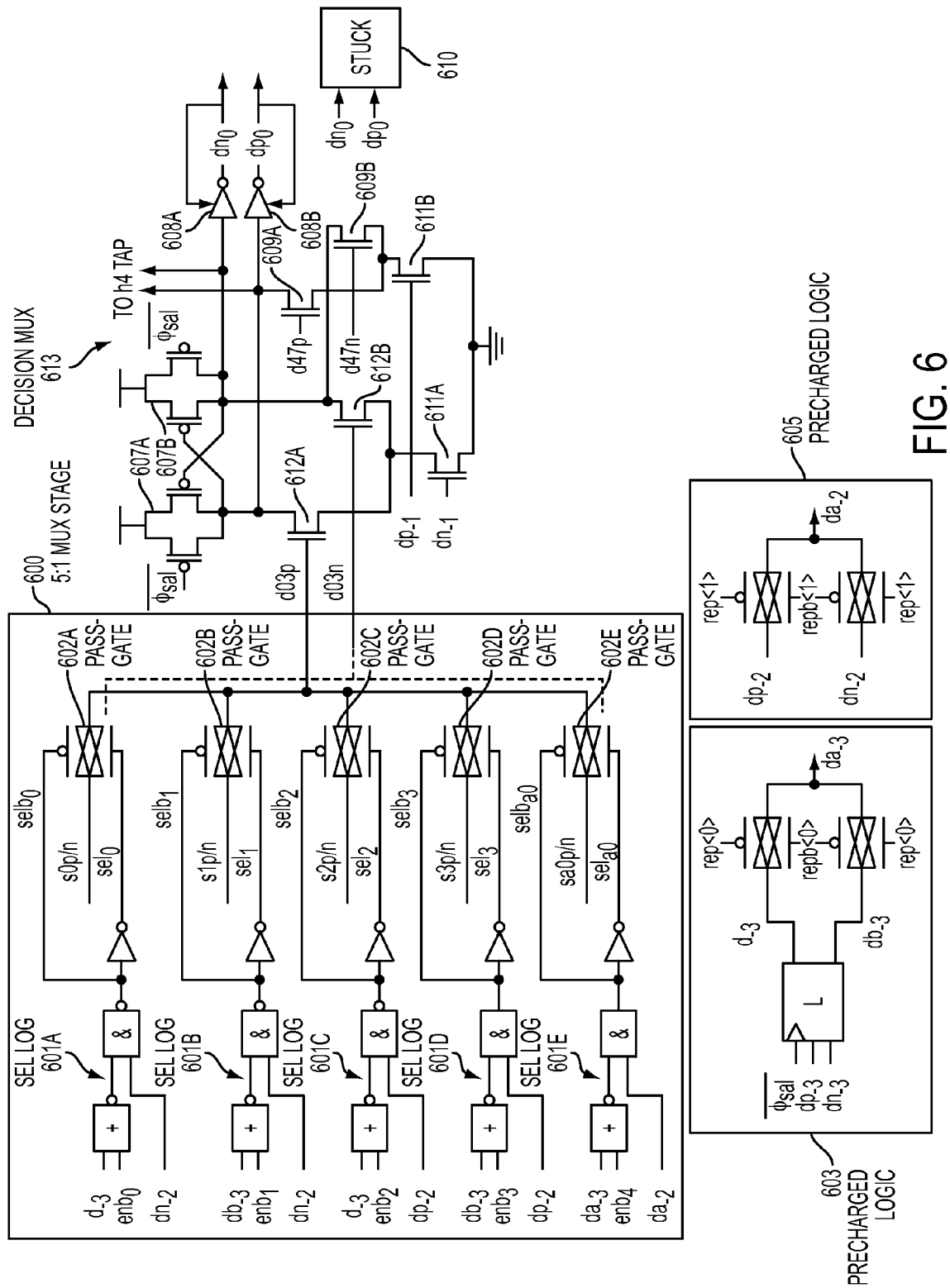
FIG. 6 is a circuit diagrams illustrating an embodiment a DFE slice including swapping circuitry for a spare comparator latch, stuck detection circuitry, and dynamic output inverters for a receiver with a four-slice DFE.

FIG. 5 illustrates another embodiment of circuitry for a 5:1 multiplexer stage and a 2:1 decision multiplexer stage. The circuitry shown in FIG. 5 includes circuitry that is used to swap a spare comparator latch for one of the other comparator latches. The circuitry shown in FIG. 5 may be included in DFE slice 200 of FIG. 2 or DFE slice 300 of FIG. 3 in various embodiments. While a single 5:1 multiplexer stage 500 is shown in FIG. 5, a second multiplexer stage 500 is also included to implement a DFE slice. Multiplexer stage 500 of FIG. 5 includes selection logic stages 501A-E, passgates 502A-E, and precharged logic circuits 503 and 505, which function as described above with respect to multiplexer stage 400 and precharged logic circuits 403 and 405 of FIG. 4. The outputs d03p/n of the 5:1 multiplexer stage 500 is provided to the 2:1 decision multiplexer stage 513 via input switches 512A-B. The output d47p/n of the second 5:1 multiplexer stage (not shown) are input to the 2:1 decision multiplexer stage 513 via input switches 509A-B. Previous decision signal input switches 511A-B receive previous decision signals $dp_{-1}$ and $dn_{-1}$, which control which of the two inputs from the two 5:1 multiplexers is selected. Cross-coupled switches 507A-B are controlled by clock signal $\Phi_{sal}$ and determine timing in the 2:1 decision multiplexer stage 513. Output inverters 508A-B output slice output signals $dp_0$ and $dn_0$. The output signals $dp_0$ and $dn_0$ are also output to the passgate/XOR logic 212/312 as was shown in FIGS. 2 and 3 as signal h4.

FIG. 6 illustrates another embodiment of circuitry for a 5:1 multiplexer stage and a 2:1 decision multiplexer stage. The circuitry shown in FIG. 6 includes circuitry that is used to swap a spare comparator latch for one of the other comparator latches, and further comprises stuck detection circuitry and dynamic output inverters. The circuitry that is shown in FIG. 6 may be included in DFE slice 200 of FIG. 2 or DFE slice 300 of FIG. 3 in various embodiments. While a single 5:1 multiplexer stage 600 is shown in FIG. 6, a second multiplexer stage 600 is also included to implement a DFE slice. Multiplexer stage 600 of FIG. 6 includes selection logic stages 601A-E, passgates 602A-E, and precharged logic circuits 603 and 605, which function as described above with respect to multiplexer stage 400 and precharged logic circuits 403 and 405 of FIG. 4. The outputs d03$p/n$ of the 5:1 multiplexer stage 600 is provided to the 2:1 decision multiplexer stage 613 via input switches 612A-B. The output d47$p/n$ of the second 5:1 multiplexer stage (not shown) are input to the 2:1 decision multiplexer stage 613 via input switches 609A-B. Previous decision signal input switches 611A-B receive previous decision signals $dp_{-1}$ and $dn_{-1}$, which control which of the two inputs from the two 5:1 multiplexers is selected. Cross-coupled switches 607A-B are controlled by clock signal $\Phi_{sal}$ and determine timing in the 2:1 decision multiplexer stage 613. Dynamic inverters 608A-B, which are discussed in further detail with respect to FIG. 7, output slice output signals $dp_0$ and $dn_0$, and are controlled by stuck detection circuitry 610, which is discussed in further detail below with respect to FIG. 8.

Figure 7:
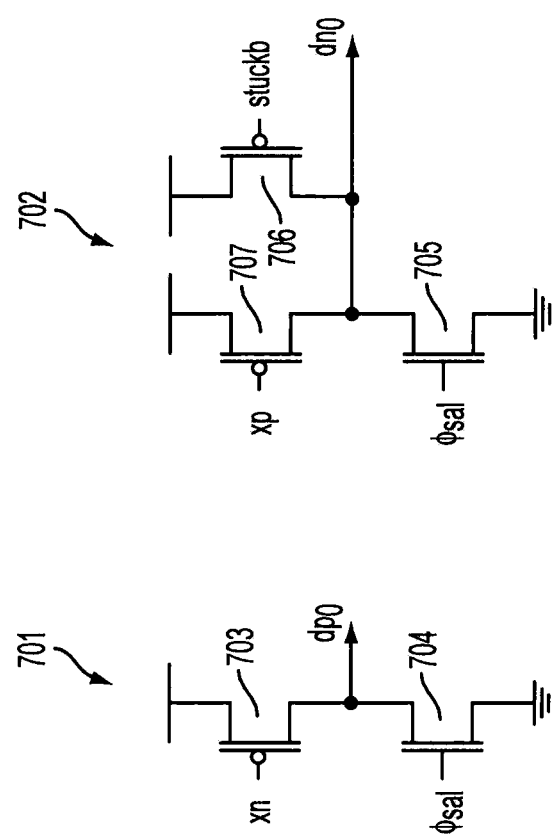
FIG. 7 is a circuit diagram illustrating an embodiment of dynamic inverters for use in conjunction with stuck detection circuitry for a receiver with a four-slice DFE.

FIG. 7 illustrates an embodiment of dynamic inverters 701 and 702, which may comprise dynamic inverters 608A-Bas were shown in FIG. 6. Dynamic inverters 701 and 702 may invert the output signal $dp/n_n$ based on clock signal $\Phi_{sal}$. Dynamic inverter 701 receives clock signal $\Phi_{sal}$ and signal xn as inputs to switches 704 and 703, respectively, and outputs slice output signal $dp_0$. Dynamic inverter 702 receives clock signal $\Phi_{sal}$, signal xp, and stuck detect signal stuckb as inputs to switches 705, 707, and 706, respectively, and outputs slice output signal $dn_0$. The dynamic inverter 702 receives the stuck detection signal stuckb from stuck detection circuitry 610 of FIG. 6 (also discussed in further detail with respect to FIG. 8) in the event both the output signals $dn_0$ and $dp_0$ are low, which may cause a stuck condition in the dynamic inverters 701 and 702; the stuck detection signal causes the output signal $dn_0$ to be pulled high to clear the stuck condition.

Figure 8:
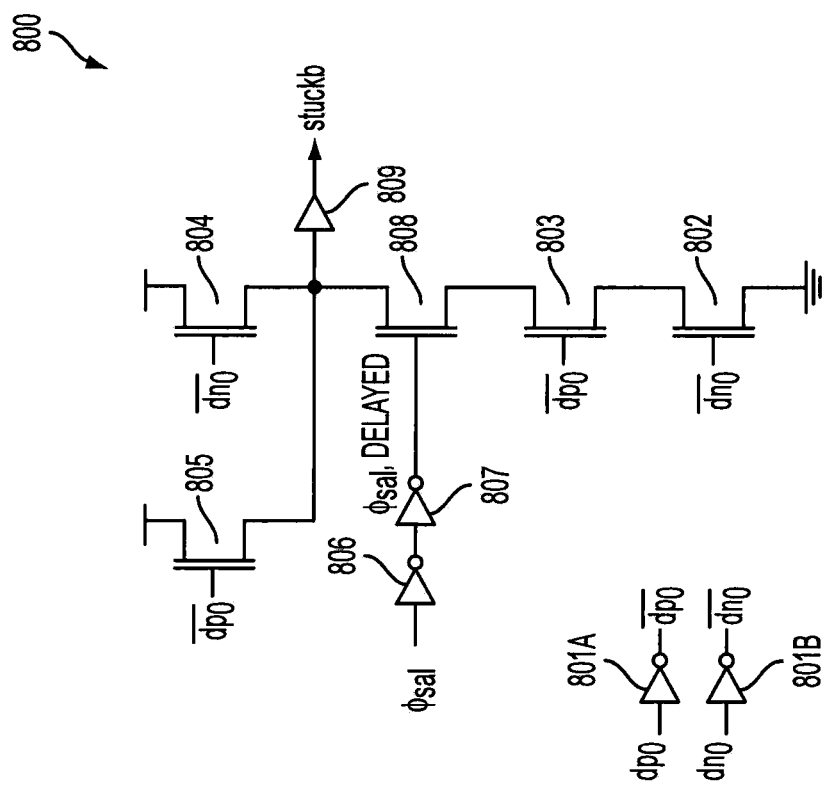
FIG. 8 is a circuit diagram illustrating an embodiment of struck detection circuitry for a receiver with a four-slice DFE.

FIG. 8 illustrates an embodiment of stuck detection circuitry 800, which may comprise stuck detection circuitry 610 of FIG. 6, and provides the stuck detection signal stuckb to switch 706 of dynamic inverter 702 shown in FIG. 7. A stuck condition is detected by stuck detection circuitry 800 when both slice output signals $dn_0$ and $dp_0$ are low. The two input signals $dp_0$, $dn_0$ are first inverted by inverters 801A-B, and then the inverse of $dp_0$ is input to switches 803 and 805, and the inverse of $dn_0$ is input to switches 802 and 804. The clock signal $\Phi_{sal}$ is input to delay stages 806 and 807 and then to switch 808. The stuck detect signal stuckb is output by stuck signal output stage 809 to switch 706 that was shown in FIG. 7, and causes the output signal $dn_0$ to be pulled high to clear the stuck condition.

Figure 9:
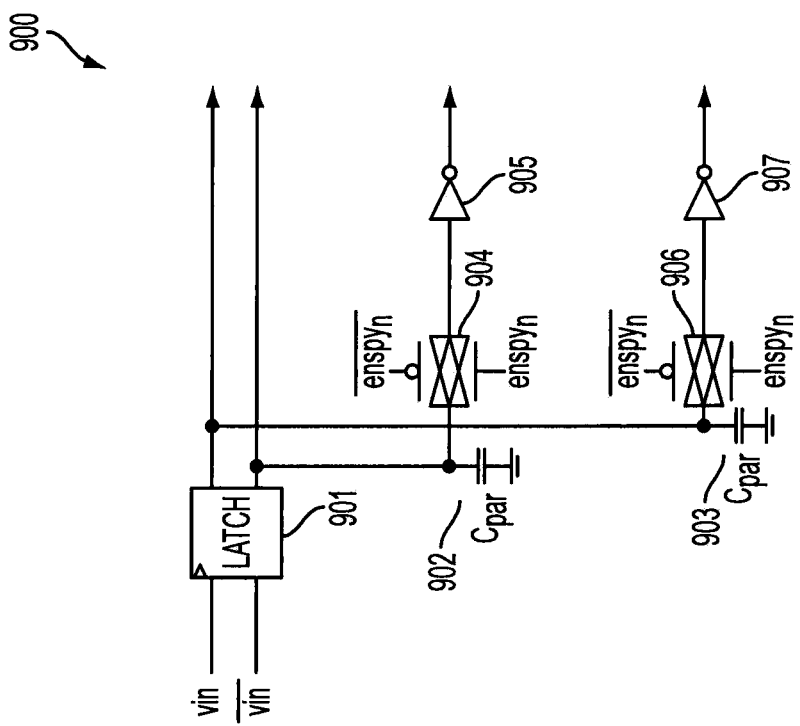
FIG. 9 is a circuit diagram illustrating an embodiment of spy multiplexer enable circuitry for a receiver with a four-slice DFE.

FIG. 9 illustrates an embodiment of spy multiplexer enable circuitry 900 for a receiver with a four-slice DFE, which may be used in conjunction with spy multiplexer 210 or 310 as were shown in FIGS. 2 and 3. Spy multiplexer enable circuitry 900 is used for reduce parasitic capacitance that may be caused by the spy multiplexer 210/310. A voltage Vin and its inverse are both input to a comparator latch 901, which represents one of comparator latches 206A-206E or 208A-208A. The capacitances 902 and 903 represent the overall capacitance on the output nodes of latch 901, and must be minimized. Each of passgates 904 and 906 receive enspy$_n$ signals as inputs, and output, via respective inverters 905 and 907, enable signals to the spy multiplexer 210/310. The passgates 904 and 906 shield the input loads of the inverters 905 and 907 when the spy multiplexer 210/310 is not active. The passgates 904 and 906 may be relatively small and placed close to the latch 901.

Figure 10:
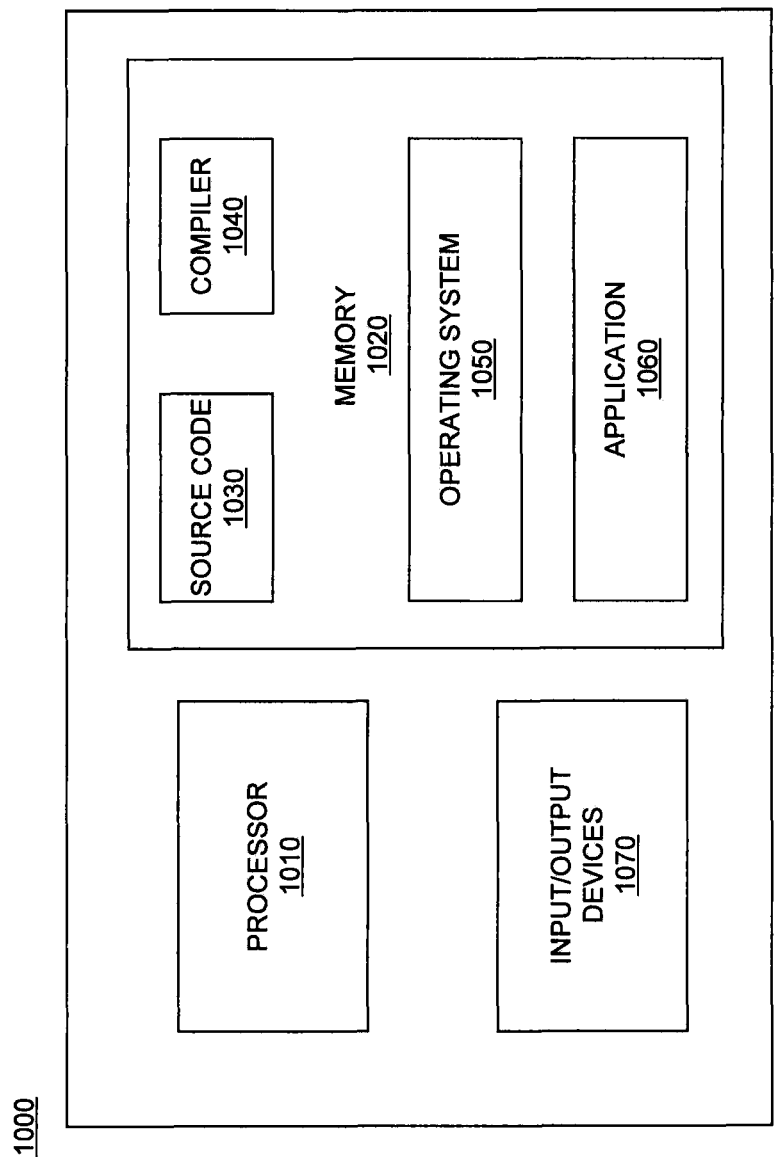
FIG. 10 is a block diagram of an embodiment of a computer that may be used in conjunction with embodiments of receiver with a four-slice DFE.

FIG. 10 illustrates an example of a computer 1000 which may be utilized by exemplary embodiments of a receiver with a four-slice DFE. Various operations discussed above may utilize the capabilities of the computer 1000. One or more of the capabilities of the computer 1000 may be incorporated in any element, module, application, and/or component discussed herein. For example, embodiments of a receiver with a four-slice DFE may be incorporated into input/output (I/O) devices 1070.

The computer 1000 includes, but is not limited to, PCs, workstations, laptops, PDAs, palm devices, servers, storages, and the like. Generally, in terms of hardware architecture, the computer 1000 may include one or more processors 1010, memory 1020, and one or more I/O devices 1070 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 1010 is a hardware device for executing software that can be stored in the memory 1020. The processor 1010 can be virtually any custom made or commercially available processor, a central processing unit (CPU), a digital signal processor (DSP), or an auxiliary processor among several processors associated with the computer 1000, and the processor 1010 may be a semiconductor based microprocessor (in the form of a microchip) or a macroprocessor.

The memory 1020 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 1020 may incorporate electronic, magnetic, optical, and/or other types of storage media. Note that the memory 1020 can have a distributed architecture, where various components are situated remote from one another, but can be accessed by the processor 1010.

The software in the memory 1020 may include one or more separate programs, each of which comprises an ordered listing of executable instructions for implementing logical functions. The software in the memory 1020 includes a suitable operating system (O/S) 1050, compiler 1040, source code 1030, and one or more applications 1060 in accordance with exemplary embodiments. As illustrated, the application 1060 comprises numerous functional components for implementing the features and operations of the exemplary embodiments. The application 1060 of the computer 1000 may represent various applications, computational units, logic, functional units, processes, operations, virtual entities, and/or modules in accordance with exemplary embodiments, but the application 1060 is not meant to be a limitation.

The operating system 1050 controls the execution of other computer programs, and provides scheduling, input-output control, file and data management, memory management, and communication control and related services. It is contemplated by the inventors that the application 1060 for implementing exemplary embodiments may be applicable on all commercially available operating systems.

Application 1060 may be a source program, executable program (object code), script, or any other entity comprising a set of instructions to be performed. When a source program, then the program is usually translated via a compiler (such as the compiler 1040), assembler, interpreter, or the like, which may or may not be included within the memory 1020, so as to operate properly in connection with the O/S 1050. Furthermore, the application 1060 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 1070 may include input devices such as, for example but not limited to, a mouse, keyboard, scanner, microphone, camera, etc. Furthermore, the I/O devices 1070 may also include output devices, for example but not limited to a printer, display, etc. Finally, the I/O devices 1070 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 1070 also include components for communicating over various networks, such as the Internet or intranet.

If the computer 1000 is a PC, workstation, intelligent device or the like, the software in the memory 1020 may further include a basic input output system (BIOS) (omitted for simplicity). The BIOS is a set of essential software routines that initialize and test hardware at startup, start the O/S 1050, and support the transfer of data among the hardware devices. The BIOS is stored in some type of read-only-memory, such as ROM, PROM, EPROM, EEPROM or the like, so that the BIOS can be executed when the computer 1000 is activated.

When the computer 1000 is in operation, the processor 1010 is configured to execute software stored within the memory 1020, to communicate data to and from the memory 1020, and to generally control operations of the computer 1000 pursuant to the software. The application 1060 and the O/S 1050 are read, in whole or in part, by the processor 1010, perhaps buffered within the processor 1010, and then executed.

When the application 1060 is implemented in software it should be noted that the application 1060 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 1060 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 1060 is implemented in hardware, the application 1060 can be implemented with any one or a combination of the following technologies, which are well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The technical effects and benefits of exemplary embodiments include a receiver that has relatively low power consumption, and that may operate at relatively high data rates with a relatively low BER.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A decision feedback equalizer (DFE) slice for a receiver, comprising:
   a plurality of non-speculative DFE taps; and
   3 speculative DFE taps, wherein the 3 speculative DFE taps comprise first and second multiplexer stages, each of the first and second multiplexer stages comprising:
   4 comparator latches, each of the 4 comparator latches having a programmable offset; and
   a multiplexer that receives 4 comparator latch outputs from the 4 comparator latches and outputs a multiplexer stage output, wherein the multiplexer is controlled by previous symbol decisions $d_{n-2}$ and $d_{n-3}$, wherein the previous symbol decisions $d_{n-2}$ and $d_{n-3}$ are received from two other respective DFE slices in the receiver; and wherein the 3 speculative taps further comprise a 2:1 decision multiplexer stage that receives the multiplexer stage outputs of the first and second multiplexer stages and is controlled by a previous symbol decision $d_{n-1}$ received from a third respective DFE slice in the receiver to output a slice output signal $d_n$, and wherein the first multiplexer stage further comprises a spare comparator latch, the spare comparator latch comprising a configurable offset, wherein the spare comparator latch is configured to be swapped in for a subgroup of the other comparator latches in the first multiplexer stage, and wherein the wherein the first multiplexer stage comprises a 5:1 multiplexer.

2. The DFE slice of claim 1, wherein the DFE slice is controlled by a quarter rate clock signal, and wherein the receiver comprises four DFE slices.

3. The DFE slice of claim 1, wherein the non-speculative DFE taps comprise switched cap DFE taps, and wherein the number of non-speculative DFE taps is greater than or equal to 3.

4. The DFE slice of claim 1, wherein each DFE slice further comprises a first-in-first-out (FIFO) queue, wherein the FIFO queue in each DFE slice receives a signal comprising an slice output signal of another DFE slice of the receiver, and wherein the FIFO queue provides inputs to the plurality of non-speculative DFE taps.

5. The DFE slice of claim 1, further comprising a spy multiplexer, wherein the spy multiplexer outputs a signal from a selected comparator latch connected to the first and second multiplexer stages.

6. The DFE slice of claim 1, wherein the slice output signal $d_n$ is fed back via a feedback path to a feedback DFE tap that comprises one of the non-speculative DFE taps.

7. The DFE slice of claim 6, wherein the 2:1 decision multiplexer further comprises dynamic inverters that output the slice output signal $d_n$, and stuck detection circuitry in the feedback path to the feedback DFE tap, wherein the stuck detection circuitry is configured to detect a stuck condition in the dynamic inverters and pull the slice output signal $d_n$ high in response to detection of the stuck condition.

8. The DFE slice of claim 1, wherein the multiplexer comprises a plurality of passgates, each passgate corresponding to a respective comparator latch.

9. A receiver with a four-slice decision feedback equalizer (DFE), comprising:
a clock signal input configured to receive a clock signal;
a clock signal divider configured to output four quarter rate clock signals based on the received clock signal; and
four DFE slices, wherein each of the four DFE slices receives a respective quarter rate clock signal of the four quarter rate clock signals from the clock signal divider, wherein each of the four DFE slices comprises a respective DFE comprising 3 speculative taps and a plurality of non-speculative DFE taps, and wherein each of the four DFE slices outputs a respective symbol decision $d_n$, $d_{n-1}$, $d_{n-2}$, and $d_{n-3}$;

wherein the 3 speculative taps comprise first and second multiplexer stages, each of the first and second multiplexer stages comprising:
4 comparator latches, each of the 4 comparator latches having a programmable offset; and
a multiplexer that receives 4 comparator latch outputs from the 4 comparator latches and outputs a multiplexer stage output, wherein the multiplexer is controlled by previous symbol decisions $d_{n-2}$ and $d_{n-3}$; and wherein the 3 speculative taps further comprise a 2:1 decision multiplexer stage that receives the multiplexer stage outputs of the first and second multiplexer stages and is controlled by controlled by a previous symbol decision $d_{n-1}$ to output a slice output signal $d_n$, and wherein the first multiplexer stage further comprises a spare comparator latch, the spare comparator latch comprising a configurable offset, wherein the spare comparator latch is configured to be swapped in for any of the other 4 comparator latches in the first multiplexer stage, and wherein the wherein the first multiplexer stage comprises a 5:1 multiplexer.

10. The receiver of claim 9, further comprising an input stage comprising a continuous-time linear equalizer (CTLE) that provides a bandwidth enhanced input signal to the four DFE slices.

11. The receiver of claim 9, wherein the plurality of non-speculative DFE taps comprise switched cap DFE taps.

12. The receiver of claim 9, wherein the number of non-speculative DFE taps is greater than or equal to 3.

13. The receiver of claim 9, further comprising a spy multiplexer, wherein the spy multiplexer outputs a signal from a selected comparator latch connected to the first and second multiplexer stages.

14. The receiver of claim 9, wherein the slice output signal $d_n$ is fed back via a feedback path to a feedback DFE tap that comprises one of the non-speculative DFE taps.

15. The receiver of claim 9, wherein the multiplexer comprises a plurality of passgates, each passgate corresponding to a respective comparator latch.

16. A decision feedback equalizer (DFE) slice for a receiver, comprising:
a plurality of non-speculative DFE taps; and
3 speculative DFE taps, wherein the 3 speculative DFE taps comprise first and second multiplexer stages, each of the first and second multiplexer stages comprising:
4 comparator latches, each of the 4 comparator latches having a programmable offset; and
a multiplexer that receives 4 comparator latch outputs from the 4 comparator latches and outputs a multiplexer stage output, wherein the multiplexer is controlled by previous symbol decisions $d_{n-2}$ and $d_{n-3}$, wherein the previous symbol decisions $d_{n-2}$ and $d_{n-3}$ are received from two other respective DFE slices in the receiver; and wherein the 3 speculative taps further comprise a 2:1 decision multiplexer stage that receives the multiplexer stage outputs of the first and second multiplexer stages and is controlled by a previous symbol decision $d_{n-1}$ received from a third respective DFE slice in the receiver to output a slice output signal $d_n$, and wherein the first multiplexer stage further comprises 2 spare comparator latches, each of the 2 spare comparator latches comprising a configurable offset, wherein the 2 spare comparator latches are each configured to be swapped in for a subgroup of the other comparator latches in first multiplexer stage, and wherein the first multiplexer stage comprises a 6:1 multiplexer.

17. A decision feedback equalizer (DFE) slice for a receiver, comprising:
a plurality of non-speculative DFE taps; and
3 speculative DFE taps, wherein the 3 speculative DFE taps comprise first and second multiplexer stages, each of the first and second multiplexer stages comprising:

4 comparator latches, each of the 4 comparator latches having a programmable offset; and a multiplexer that receives 4 comparator latch outputs from the 4 comparator latches and outputs a multiplexer stage output, wherein the multiplexer is controlled by previous symbol decisions $d_{n-2}$ and $d_{n-3}$, wherein the previous symbol decisions $d_{n-2}$ and $d_{n-3}$ are received from two other respective DFE slices in the receiver; and wherein the 3 speculative taps further comprise a 2:1 decision multiplexer stage that receives the multiplexer stage outputs of the first and second multiplexer stages and is controlled by a previous symbol decision $d_{n-1}$ received from a third respective DFE slice in the receiver to output a slice output signal $d_n$, and further comprising a spy multiplexer, wherein the spy multiplexer outputs a signal from a selected comparator latch connected to the first and second multiplexer stages.

18. A decision feedback equalizer (DFE) slice for a receiver, comprising:

a plurality of non-speculative DFE taps; and 3 speculative DFE taps, wherein the 3 speculative DFE taps comprise first and second multiplexer stages, each of the first and second multiplexer stages comprising:

4 comparator latches, each of the 4 comparator latches having a programmable offset; and a multiplexer that receives 4 comparator latch outputs from the 4 comparator latches and outputs a multiplexer stage output, wherein the multiplexer is controlled by previous symbol decisions $d_{n-2}$ and $d_{n-3}$, wherein the previous symbol decisions $d_{n-2}$ and $d_{n-3}$ are received from two other respective DFE slices in the receiver; and wherein the 3 speculative taps further comprise a 2:1 decision multiplexer stage that receives the multiplexer stage outputs of the first and second multiplexer stages and is controlled by a previous symbol decision $d_{n-1}$ received from a third respective DFE slice in the receiver to output a slice output signal $d_n$, wherein the slice output signal $d_n$ is fed back via a feedback path to a feedback DFE tap that comprises one of the non-speculative DFE taps, and wherein the 2:1 decision multiplexer further comprises dynamic inverters that output the slice output signal $d_n$, and stuck detection circuitry in the feedback path to the feedback DFE tap, wherein the stuck detection circuitry is configured to detect a stuck condition in the dynamic inverters and pull the slice output signal $d_n$ high in response to detection of the stuck condition.

19. A receiver with a four-slice decision feedback equalizer (DFE), comprising:

a clock signal input configured to receive a clock signal;

a clock signal divider configured to output four quarter rate clock signals based on the received clock signal; and four DFE slices, wherein each of the four DFE slices receives a respective quarter rate clock signal of the four quarter rate clock signals from the clock signal divider, wherein each of the four DFE slices comprises a respective DFE comprising 3 speculative taps and a plurality of non-speculative DFE taps, and wherein each of the four DFE slices outputs a respective symbol decision $d_n$, $d_{n-1}$, $d_{n-2}$, and $d_{n-3}$;

wherein the 3 speculative taps comprise first and second multiplexer stages, each of the first and second multiplexer stages comprising:

4 comparator latches, each of the 4 comparator latches having a programmable offset; and a multiplexer that receives 4 comparator latch outputs from the 4 comparator latches and outputs a multiplexer stage output, wherein the multiplexer is controlled by previous symbol decisions $d_{n-2}$ and $d_{n-3}$; and wherein the 3 speculative taps further comprise a 2:1 decision multiplexer stage that receives the multiplexer stage outputs of the first and second multiplexer stages and is controlled by controlled by a previous symbol decision $d_{n-1}$ to output a slice output signal $d_n$, and wherein the first multiplexer stage further comprises 2 spare comparator latches, each of the 2 spare comparator latches comprising a configurable offset, wherein the 2 spare comparator latches are each configured to be swapped in for a subgroup of other comparator latches in first multiplexer stage, and wherein the first multiplexer stage comprises a 6:1 multiplexer.

20. A receiver with a four-slice decision feedback equalizer (DFE), comprising:

a clock signal input configured to receive a clock signal;

a clock signal divider configured to output four quarter rate clock signals based on the received clock signal; and four DFE slices, wherein each of the four DFE slices receives a respective quarter rate clock signal of the four quarter rate clock signals from the clock signal divider, wherein each of the four DFE slices comprises a respective DFE comprising 3 speculative taps and a plurality of non-speculative DFE taps, and wherein each of the four DFE slices outputs a respective symbol decision $d_n$, $d_{n-1}$, $d_{n-2}$, and $d_{n-3}$;

wherein the 3 speculative taps comprise first and second multiplexer stages, each of the first and second multiplexer stages comprising:

4 comparator latches, each of the 4 comparator latches having a programmable offset; and a multiplexer that receives 4 comparator latch outputs from the 4 comparator latches and outputs a multiplexer stage output, wherein the multiplexer is controlled by previous symbol decisions $d_{n-2}$ and $d_{n-3}$;

wherein the 3 speculative taps further comprise a 2:1 decision multiplexer stage that receives the multiplexer stage outputs of the first and second multiplexer stages and is controlled by controlled by a previous symbol decision $d_{n-1}$ to output a slice output signal $d_n$; and further comprising a spy multiplexer, wherein the spy multiplexer outputs a signal from a selected comparator latch connected to the first and second multiplexer stages.

* * * * *